United States Patent [19]

Lenz

[11] 4,321,636

[45] Mar. 23, 1982

[54] CATEYE-SIGNAL INTERCEPT DETECTOR FOR ALIGNING A READ-WRITE HEAD ABOVE A COMPUTER DATA STORAGE DISK

[75] Inventor: Charles E. Lenz, Omaha, Nebr.

[73] Assignee: Magnetic Peripherals Inc., Minneapolis, Minn.

[21] Appl. No.: 131,261

[22] Filed: Mar. 17, 1980

[51] Int. Cl.³ .............................................. G11B 21/10
[52] U.S. Cl. ........................................ 360/77; 324/210
[58] Field of Search ..................... 360/77, 69, 75, 109, 360/97–99, 135; 324/212, 210, 121 R, 121 E

[56] References Cited

U.S. PATENT DOCUMENTS

| | | | |
|---|---|---|---|
| 3,742,470 | 6/1973 | Ha et al. | 360/77 |
| 4,053,937 | 10/1977 | Hersey | 360/77 |
| 4,084,201 | 4/1978 | Hack et al. | 360/77 |
| 4,087,842 | 5/1978 | Manly | 360/77 |
| 4,149,199 | 4/1979 | Chick et al. | 360/77 |

FOREIGN PATENT DOCUMENTS 2402202  8/1974  Fed. Rep. of Germany ........ 360/77

OTHER PUBLICATIONS

Xerox Disclosure Journal, W. B. Watson, Method of Forming Alignment Disk, vol. 1, No. 2, Feb. 1976, p. 75.
IBM Tech. Disc. Bull., D. E. Sibbers, Eccentricity Tolerant Head Alignment Check, vol. 17, No. 11, Apr. 1975, pp. 3415–3416.

Primary Examiner—Alfred H. Eddleman
Attorney, Agent, or Firm—Edwin H. Crabtree; Robert M. Angus; Joseph A. Genovese

[57] ABSTRACT

A cateye-signal intercept detector for aligning a read-write head above a computer data storage disk. The detector used in conjunction with a standard disk having two adjacent cateye-type head alignment tracks thereon. The subject invention automates the detection of each intercept in the cateye-signal so that associated processing equipment responsive to the output signal produced can measure the read-write head disk alignment automatically.

8 Claims, 7 Drawing Figures

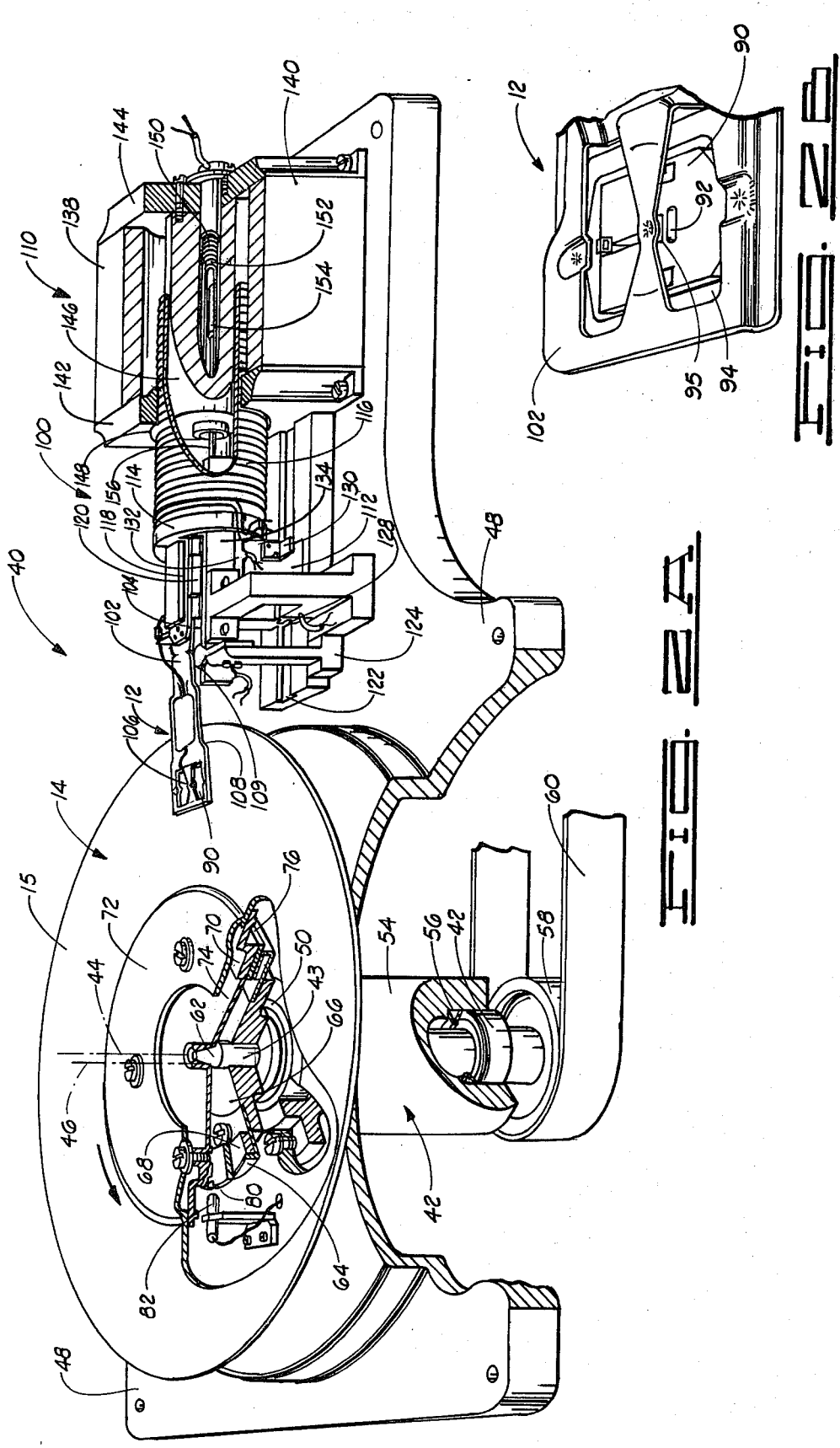

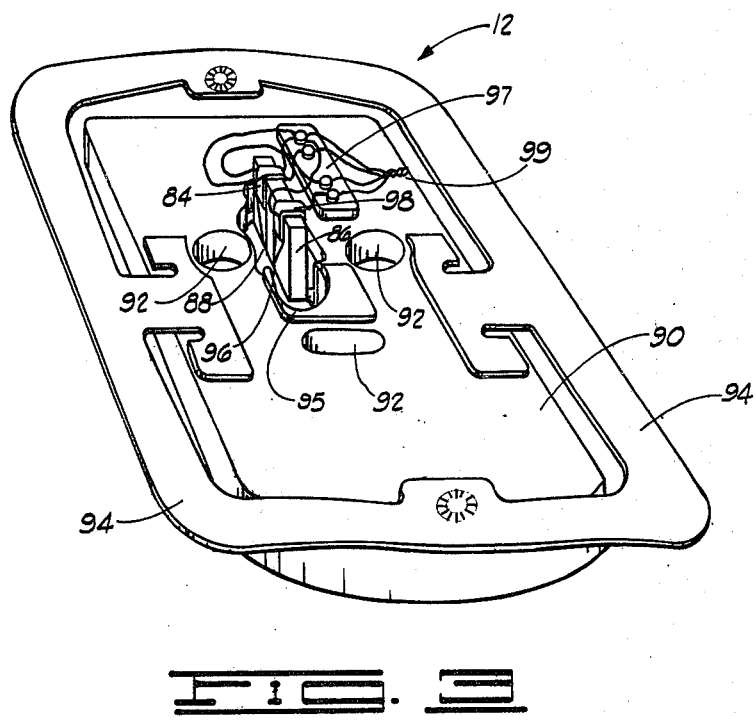
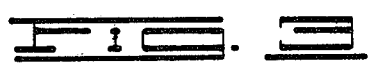
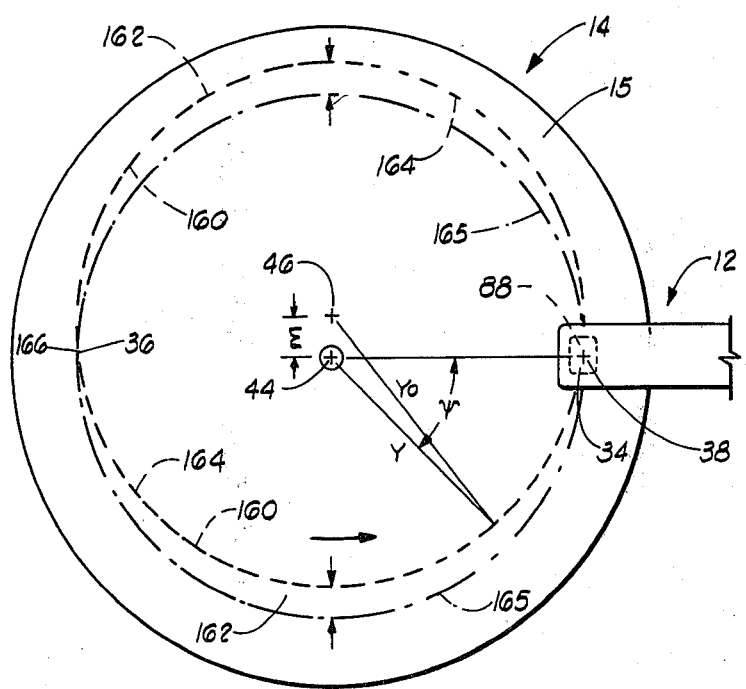
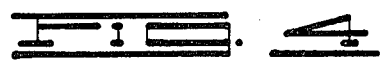

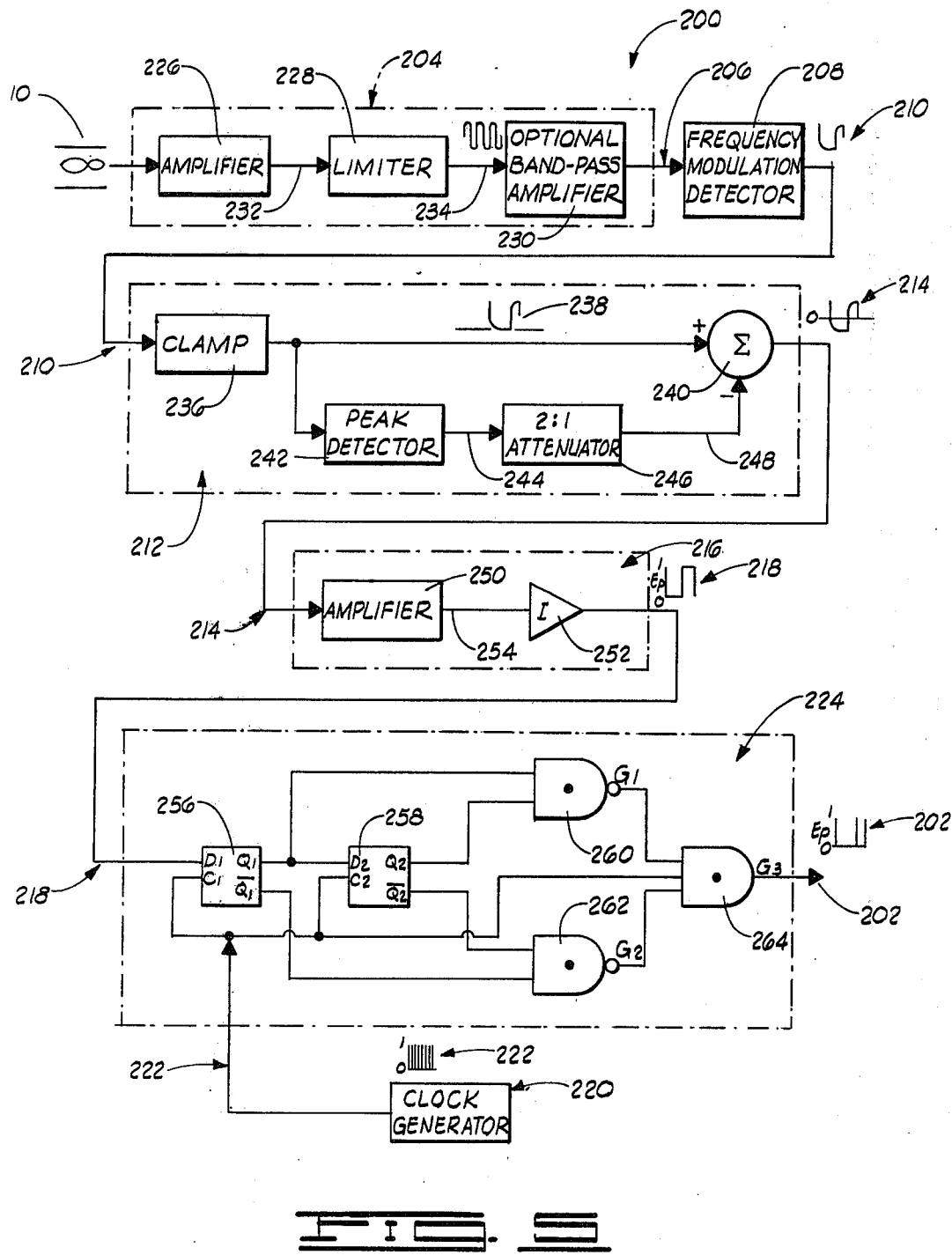

CATEYE-SIGNAL INTERCEPT DETECTOR FOR ALIGNING A READ-WRITE HEAD ABOVE A COMPUTER DATA STORAGE DISK

BACKGROUND OF THE INVENTION

Heretofore, measuring the rotational envelope intercept position in the well-known cateye oscilloscope display used to produce and utilize customer-engineering and other standard head-alignment disks has been a highly critical operation which was performed manually. The cateye oscilloscope pattern is commonly used to test the alignment of a read-write head directly with a customer-engineering test disk or with a primary-standard test disk. The horizontal displacement of the pattern is proportional to the time relative to a disk-oriented rotational index. The vertical displacement of the pattern is proportional to the instantaneous value of the cateye-signal derived by well-known means. The pattern consists of two intensified sinusoidal curves that are simultaneously displayed 180 degrees out of phase. The three points where the sinusoidal patterns intersect are commonly called rotational-envelope intercepts or simply "intercepts". The sinusoidal enclosed area between any two adjacent intercepts is called a "lobe". The pattern is generated during a single revolution of the disk and is repeated continuously.

To generate the cateye test pattern a special test disk is used with a pair of sinusoidally written simultaneously readable concentric tracks written eccentric to the rotational axis. The track frequencies are typically 1.270 and 1.280 megahertz respectively. The track axis is displaced by a constant distance, here denoted by "$\epsilon$", typically 0.0015 inches, from the rotational axis. By knowing the value of $\epsilon$, the constant magnitude of the radial misalignment "$\delta$" of the head gap from the nominal track radius can be calculated from the following well-known formula: $\delta = \epsilon \sin(\pi x_2/x_1)$. The angle is in radians, $x_1$ is the distance between alternate intercepts and $x_2$ is the linear displacement, positive to the right, of the center intercept from the midpoint between the outer intercepts.

Until now, automated interpretation of the cateye-signal as described above by any other means has been retarded by insufficient knowledge of the signal's analytical nature. The findings as disclosed herein have overcome this restriction and made automation of detecting the intercepts of the cateye-signal possible so the read-write head can be properly and accurated aligned.

SUMMARY OF THE INVENTION

The subject invention emits a short digital pulse each time an intercept of the cateye signal occurs so that the resulting train of pulses permits automating the operation of reading and decoding the cateye pattern without the use of an oscilloscope. In this manner, the invention can measure intercept positions with over 200 times the accuracy of an operator with an oscilloscope.

The intercept detector further permits full automation of a read-write head to disk alignment test, thereby eliminating human error and improving the production quality, reducing of recalls of related equipment, and providing a high level of versatility permitting both factory and field use of the test equipment.

Further, the intercept detector greatly speeds the alignment of the read-write head above a computer data-storage disk by typically 2400 times when compared to the manual alignment using interpretation of the cateye-signal with an oscilloscope.

The cateye-signal intercept detector for aligning a read-write head above a computer data-storage disk is used in conjunction with a standard test disk having two adjacent cateye-type head-alignment tracks. The intercept detector includes a frequency-modulation detector for receiving the cateye signal and generating an output signal proportional to the instantaneous deviation of the carrier frequency of the cateye signal from it's means. A polarity detector is connected to the modulation detector for receiving modulation detector's output signal and producing a binary output signal having a logical value of 1 when the polarity of the modulation detector's output signal is positive and a logical value of 0 at all other times. A transition detector is connected to the polarity detector for generating a train of selected clock pulses. Each transition detector output pulse is the second clock pulse present after an instant in which the binary output signal changes state if a sufficient portion of the first clock pulse succeeds the transition of the binary output signal to trigger the transition detector. If the first clock pulse is not sufficient then the transition detector alternatively emits the second complete clock pulse following a given transition of the binary output signal.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 2A illustrates a standard computer storage disk with read-write head.

FIG. 2B illustrates a detailed perspective view of the read-write head.

FIG. 3 illustrates an enlarged perspective view of the read-write head.

FIG. 4 illustrates a top view of the cateye tracks greatly enlarged on a standard storage disk.

FIG. 5 illustrates a diagram of the components of the cateye-signal intercept detector.

DETAILED DESCRIPTION OF THE DRAWINGS

Figure 1A:
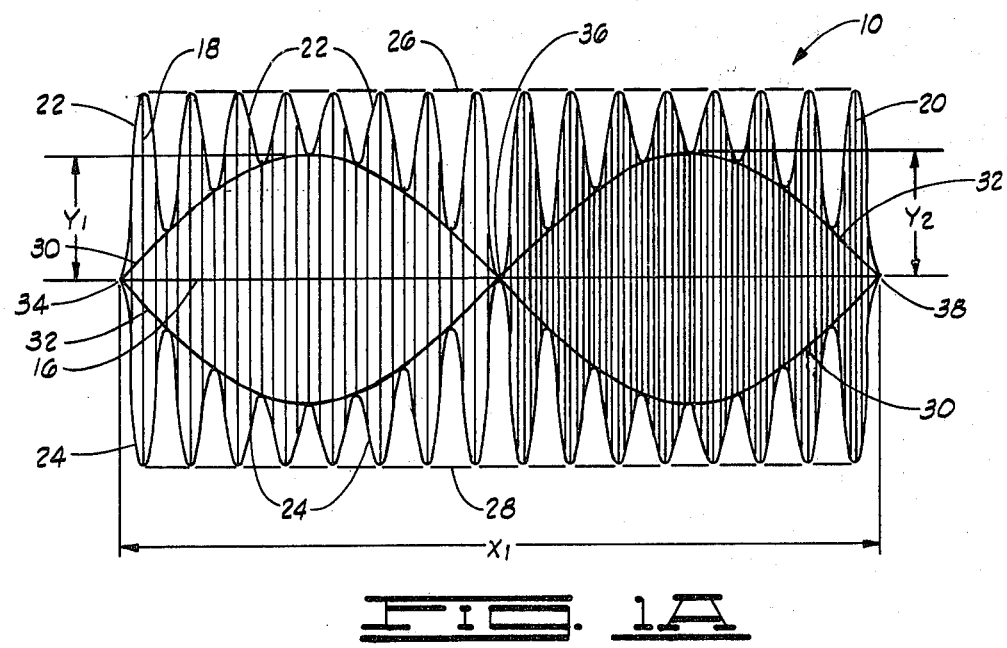
FIG. 1A illustrates the cateye signal produced on an oscilloscope with the head gap on the read-write head perfectly aligned.
Figure 1B:
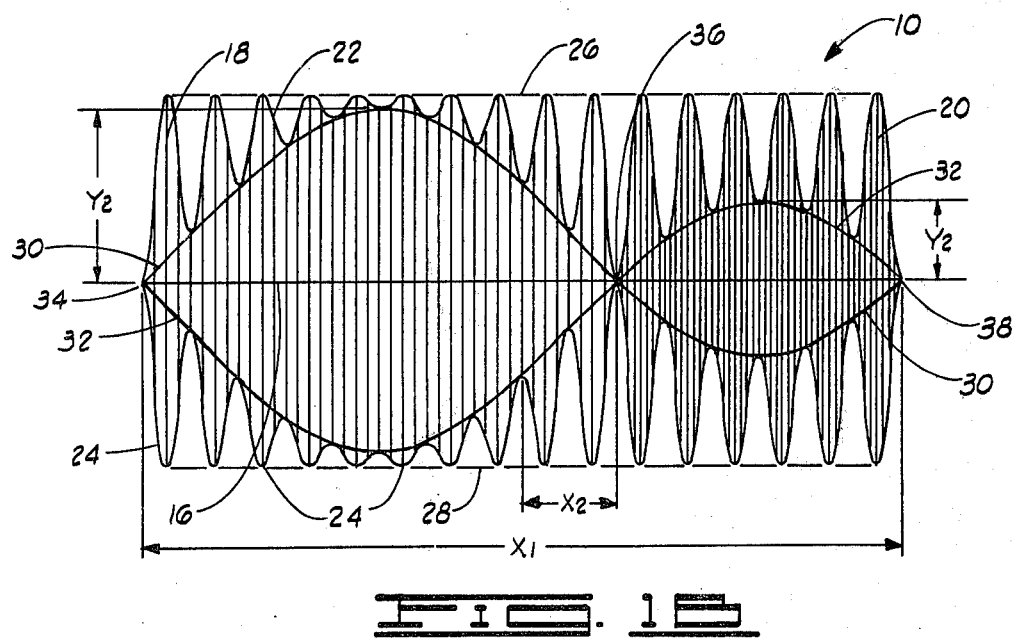
FIG. 1B illustrates the cateye signal produced on an oscilloscope with the head gap misaligned outward from the disk axis.

In FIGS. 1A and 1B, a cateye signal designated by general reference numeral 10 is shown as it would appear on an oscilloscope screen. The oscilloscope is not shown in the drawings, but in practice it would be connected to a read-write head assembly 12 for reading a computer data storage disk assembly 14 with a disk 15. The head 12 and disk 14 are shown in FIG. 2A. The cateye signal 10 is an electrical waveform generated by the read-write head assembly 12 when reading the memory disk 15 specifically prepared for equipment calibration. The purpose of the cateye signal 10 is to provide a convenient means for determining whether a head gap on the read-write head assembly 12 is accurately located at a specified distance from the axis of memory disk 15. One cycle of the cateye signal 10 is generated by each revolution of the disk 15. On the oscilloscope, one cycle of the signal 10 appears as plotted along an axis 16 in FIG. 1A when the head gap is perfectly positioned.

The cateye signal 10 consists basically of a quasi-sinusoidal carrier that is simultaneously modulated both in frequency and in amplitude. In FIG. 1A, a vertical line 18 represents one-half cycle of that carrier. The instantaneous frequency $f_{ci}(t)$ of the carrier varies, but its nominal value is typically $f_{to}$—which equals 1.270 megahertz—during the initial part of the pattern, as shown at line 18 and $f_{ti}$—which equals 1.280 megahertz—during the terminal part of the pattern as represented by vertical 20.

The amplitude modulation of the carrier produces an upper modulation envelope 22 and a lower modulation envelope 24 that are symmetrical about the axis 16. These envelopes are quasi-sinusoidal waveforms of nominal frequency having an equation as follows:

$$f_m = (f_{ti} - f_{to})/2.$$

On the oscilloscope, the local extrema of both of the envelopes are characterized by two observable features: trace intensification resulting from the slower writing speed near the inflection points of the carrier, and further intensification due to the greater proximity of intensified regions near the inflection points of the modulation envelopes 22 and 24.

This intensification produces two results observable on the oscilloscope. They are the upper and lower extremities of a pattern with the principal and complementary tracking-limit intensification envelopes respectively appearing as intensified horizontal lines 26 and lines 28. A cateye pattern appears as intensified sinusoidal curves at lines 30 and lines 32. The principal and complementary tracking-error intensification envelopes 30 and 32 respectively, together form two successive lobes.

A frequency $f_d$ of the waveform lines 30 and 32 equals the disk velocity, typically 40 hertz. These lines 30 and 32 intersect at points 34, 36 and 38 to form left, center and right intercepts respectively. These intercepts are often called "nulls". The subject invention as described herein utilizes the fact that the instantaneous carrier frequency remains relatively constant between adjacent intercepts but changes abruptly at each intercept.

On the oscilloscope screen, the distance between the left and right intercepts—that is, between the terminal intercepts—is designated $x_1$ and, as shown in FIG. 1B, a rightward displacement of the center intercept 36 from the midpoint between the terminal intercepts 34 and 38 is designated $x_2$. In FIG. 1A, $x_2$ equals 0. Moreover, the local maxima of the lines 30 and 32 are denoted $y_1$ and $y_2$ respectively. In FIG. 1A, $y_1 = y_2$.

Under the circumstances just cited, if the head gap is moved outward from the disk axis by an amount $\delta$, line 30 in FIG. 1A will move upwardly in proportion to $\delta$, and line 32 will move downwardly by the same amount. Consequently, intercepts 34, 36 and 38 will be translated horizontally. The resultant cateye pattern depicted with alternate intercepts again terminating the horizontal axis appears in FIG. 1B. It is particularly significant that the instantaneous carrier frequency remains relatively unchanged between adjacent intercepts. The most important changes are that $x_2$ is no longer zero and that $y_1$ no longer equals $y_2$.

A misalignment between the head gap and the cateye-track pattern on disk 14 can be calculated either from the equation $$\delta = \sin(\pi \cdot (x_2)/x_1)$$

where the argument is in radians, or from the relation
$$\delta = (y_1 - y_2)/(y_1 + y_2) \cdot \epsilon.$$

The advantage of the first equation above is the relative ease and accuracy with which the variables $x_1$ and $x_2$ can be measured with an oscilloscope, while the advantage of the second equation is the ease of computation that results from the equation's linearity. Both equations have been used in practice.

In FIG. 2, a basic drive designated by general reference number 40 is shown for generating the cateye signal 10. The disk drive 40 includes a spindle assembly 42 having a spindle 43 with an axis 44. The spindle 43 is used for mounting and rotating the magnetically-coated cut otherwise non-magnetic annular data or cateye disk 15. The cateye disk 15 has two magnetized eccentric cateye tracks with a common axis 46 slightly displaced by $\epsilon$ from the spindle axis 44. The eccentric cateye tracks will be discussed thoroughly as shown in FIG. 4.

The spindle 43 provides means for rotating the disk 15 parallel to a base plate 48. The spindle 43 is supported perpendicular to the base plate 48 by bearings 50 and 52 which permit rotation. Both of the bearings are retained coaxially in a housing 54 and are preloaded by means such as spring washers 56. The spindle 43 is rotated by a concentric pulley 58 which is engaged by an endless belt 60 driven by an external electric motor which is not shown in the drawings.

The upper end of the spindle 43 includes a tapered end portion 62 that is normally ground coaxial with the spindle axis 44 to permit concentric mounting of the disk 15. To retain the disk 15, a cupped annular pole piece 64 of a magnetically soft metal is mounted concentrically on the spindle 43 beneath the tapered end portion 62 by means of non-magnetic hub 66. Within the pole-piece rim is bonded an annular magnet 68 that is uniformly magnetized vertically.

To maintain the disk 15 perpendicular to and concentric with the spindle 43, a hub adapter 70 is conically bored to fit the tapered end portion 62 precisely. The disk 15 is then secured to the periphery of the adapter 70 by a clamp 72 and associated fasteners that engage corresponding bosses of the adapter 70. The rim and hub of the adapter 70 are connected by a flexible diaphragm 74 that can be deflected downwardly by a uniform distribution of an axial force on the rim. Such a force is transmitted to the rim by a magnetically soft annular metal armature 76 attached to its lower surface. The armature 76 is attracted downwardly by the magnet 68 in conjunction with the pole piece 64 until it contacts the pole piece 64, thereby accurately retaining the entire disk assembly on the spindle assembly 42 in the proper operating position.

To remove the disk 15 and disk assembly 14 from the spindle assembly 42, it is only necessary to lift the assembly 14 by appropriate means adequate to overcome its weight, the magnetic attraction upon the armature 76 and the friction of the tapered end portion 62.

For synchronization purposes, including determination of tracking-error polarity from the cateye pattern with an oscilloscope, at least one angular position of the disk 15 must be accurately identified. This function can be performed by one or more index notches placed on the periphery of the armature 76. A cateye disk such as the disk 15 has one such index indicated by reference numeral 80. The index notch 80 is detected by proximity sensor 82—rigidly mounted on the base plate 48—that emits an electrical pulse each time the notch 80 passes thereby.

The read-write head assembly 12, due to its small size, can be more clearly seen by referring to FIGS. 2B and 3. The head assembly 12 includes a read-write coil 84 surrounding a closed magnetic core 86, and having a gap 88 located radially above the disk 15. The assembly 12 further includes a plastic head pad 90 which is designed with an aerodynamic curvature on its lower surface. Consequently, air entrained by the rotating disk 15 surface causes the pad 90 to "fly" near the disk 15 without actually contacting it, despite the downward forces in effect. The stability and flying height of the pad 90 are further affected by appropriate spoiler holes 92.

The pad 90 is supported on its radial extremities by a spring gimbal 94 with two degrees of freedom, in roll and in pitch. The pad 90 is protected by a bonded metallic wear pad 95.

The core 86 is mounted with its lower surface approximately coplanar with that of the pad 90 and with the read-write gap 88 oriented approximately radially above the disk 15. An additional erase gap 96 with an associated erase coil 98 is incorporated into the core 86 and precedes the gap 88 along the disk surface. The erase gap 96 is parallel to the read-write gap 88, and is similar to it except for a greater radial width and tangential separation. All leads of the coils 84 and 98 are brought out to a common terminal board 97 where they are connected to associated equipment by flexible cable leads 99.

Referring now back to FIG. 2A an arm assembly designated by general reference numeral 100 serves to support the head assembly 12 with the read-write gap 88 oriented approximately radially above the disk 15. The assembly 100 also applies the necessary loading force to maintain the stability and correct flying height of the head assembly 12, and lifts the assembly 12 from the surface of the disk 15 when the disk 15 is either rotating at substandard speed or stationary, thereby preventing the head pad 90 from contacting the surface of the disk 15. The arm assembly 100 includes a flexure arm 102 which is attached to a fixed arm 104. The flexure arm 102 is spot-welded to the spring gimbal 94. An integral load button 106 transfers downward force from the flexure arm 102 to the head pad 90 via the wear pad 95. To permit the force to be increased to an optimum level while the flexure arm 102 remains approximately parallel to the base plate 48, the flexure arm 102 is bent downwardly.

An additional feature of the arm assembly 100 is a ramp 108 along the bottom surface of the arm 102. The ramp 108 encounters a stationary cam 109 when the arm 102 is retracted radially from the surface of the disk 15, thereby lifting the head pad 90 and unloading it.

A positioning assembly designated by general reference numeral 110 serves to maintain the arm assembly 100 in its proper relationship to the base plate 48 and to maintain the head assembly 12 in its correct relationship to the disk assembly 14. Also, the positioning assembly 110 acts in conjunction with external feedback circuitry to rapidly move the read-write gap 88 to any permissible predetermined radial distance from the spindle axis 44 and to lift the pad 90 from the disk surface by means of the ramp 108 whenever the head assembly 12 is being withdrawn outwardly from the disk assembly 14.

The positioning assembly 110 includes a movable carriage 112 and an attached voice coil consisting of a bobbin 114 wound with a conductive-wire solenoid 116 flexibly connected to external excitation. The fixed arm 104 is firmly retained in a receiver slot 118 by means of a clamp 120. The carriage 112, in turn, is secured to the base plate 48 by means of a track 122.

A cam mount 124 is rigidly attached to the base plate 48 and includes the cam 109 attached thereto for engaging the ramp 108.

The position of the carriage 112 is continuously monitored by moving it to a known reference position established by an optical-detector assembly 128. The assembly 128 incorporates a vertically oriented light-emitting diode illuminating an integral photocell. When an opaque blade 130 attached to the carriage 112 interrupts the illumination, the carriage 112 is at a reference position. An external circuitry inductosyn slider 132 is attached to the carriage 112 and acts as an incremental encoder excited by an adjacent stator 134. As such, the stator 134 emits two independent trains of pulses whose numerical difference indicates, in increments of $\Delta r$, the net displacement of the carriage from the reference position. The constant $\Delta r$, typically 0.01 inch or less, is a design parameter of the inductosyn. Also functioning simultaneously with additional external circuitry in another mode, the slider 132 emits an analog signal indicating the position of the carriage 112 within the currently encoded position quantum. Varying monotonically throughout the quantum, the signal is zero at the quantum's midpoint.

When excited by an appropriate electrical current, the solenoid 116 supplies the force necessary to move the carriage 112 to a new position. The direction and amplitude of this force depend, respectively, upon the direction and amplitude of the current. To permit this, the solenoid 116 current requires a stationary magnetic field with which to react. This field is provided by an assembly consisting of identical, permanent magnets 138 and 140, and magnetically soft metal pole pieces 142 and 144 and a magnetically soft cylindrical metal core 146. The pole pieces 142 and 144 are rigidly attached to the base plate 48 while the core 146 is firmly supported within the voice coil 144. The magnets 138 and 140 are magnetized longitudinally with like poles adjacent. Consequently, the magnetic field necessary to intersect the solenoid 116 appears across an air gap 148 with an essentially radial flux pattern.

To permit positioning the carriage 112 and the attached components as rapidly as possible without an overshoot, it is necessary to determine the instantaneous linear velocity of the carriage 112. This information is typically provided by a voltage induced in a small velocity-transducer solenoid 150 which is wound on an insulating bobbin 152 and mounted concentrically with the core 146. The required velocity voltage is induced in coil 150 by axial translation of a longitudinally magnetized rod 154 sliding within bobbin 152 and attached to carriage 112 by an extension rod 156.

The disk drive 40, such as shown in FIG. 2, can be used either to read or to write on a normal data track or to read a cateye track on the rotating memory disk 15. To write a data track, read-write gap 88 is first positioned by means already described at the desired radius from the spindle axis 44. If necessary, the effect of any prior disk magnetization may first be eliminated by a flux field generated in core 86 by direct-current excitation of coil 98 and traversing erase cap 96 through the magnetic surface coating immediately preceding read-write gap 88. Writing is then done by passing a constant current of appropriate polarity through coil 84, thereby creating a closed flux field in the core 86 that traverses gap 88 through the adjacent magnetically coated surface of disk 15. The coating domains traversed are thereby so oriented as to effectively form an arc of a circular bar magnet of width approximately equal to the radial width of gap 88 and of the length determined by the angular motion of disk 15 while coil remains energized as described. Instantaneously reversing the current in coil 88 will cause another such contiguous bar magnet of opposite magnetic orientation to be formed. Such a procedure may then be continued throughout the space available on the track.

Data can be recorded with high density on the surface of disk 15 by frequently reversing the current in coil 88 according to a code representing an arbitrarily selected series of logical 0's and 1's. In the so-called "double-frequency" method of encoding, a continuous succession of 1's is represented by a series of contiguous magnetic increments having minimum and identical arc lengths as well as alternating magnetic orientations.

In the read mode over a rotating disk track, the n-turn read-write coil 84 generates a voltage $e_r(t)$ proportional not to the flux $\phi$ traversing its gap, but to the rate of change of that flux with elapsed time t in accordance with the well-known relationship $$e_r(t) = n \cdot (d\phi/dt)$$

if flux leakage is negligible. Consequently, $e_r(t)$ will exhibit a pulse at each interface of two track increments of opposite magnetic orientation. Adjacent pulses must obviously be of opposite polarity. When a cateye track is read, all pulses are equally spaced and so close together that $e_r(t)$ becomes approximately a sine wave.

Referring now to both FIG. 2A and FIG. 4, when a cateye disk is written, the positioning assembly 110 is commonly replaced by a micrometer-head assembly that permits continuous adjustment of the position of the read-write gap 88. Moreover, a special eccentric spindle is employed in which the axis of the tapered end portion 62 is displaced from the rotation axis 44 by $\epsilon$, typically 0.0015 inch. Thus, the axis 46 of any cateye track recorded has this same eccentricity on a normal spindle.

In the above manner, two contiguous tracks at 160 and 162 are written on the cateye disk 15 at slightly different radii and frequencies, as shown in FIG. 4. Because these tracks share a circular interface 164, a signal read-write gap spanning the interface 164 can read both tracks simultaneously. The associated read-write coil 84 will then generate the sum of the two voltages thereby induced.

The object of reading the pair of cateye tracks 160 and 162 on a standard disk drive 40 with a concentric spindle taper is to adjust the radial displacement of the read-write gap 88 from the spindle axis 44 to equal the mean gap displacement when both cateye tracks were written. This is done by first moving carriage 112 to the position where the desired gap displacement should occur. Clamp 120 is then temporarily loosened, fixed arm 104 is moved radially until the cateye signal indicates that the desired condition exists, and clamp 120 is then tightened.

FIG. 4 shows read-write gap 88 aligned at the proper distance from the spindle axis 44 and simultaneously reading both cateye tracks 160 and 162. Although the mechanical axis of disk 15 coincides with the spindle axis 44, the mutual track axis 46 is displaced from the spindle axis 44 by the distance $\epsilon$. Consequently, the cateye tracks 160 and 162 are eccentric and will wobble by an amount plus and minus $\epsilon$ beneath gap 88 as disk 15 rotates. With the disk 15 in the position shown in FIG. 4, track interface 164 and the gap locus 165 intersect under the gap 88 and approximately 180 degrees later at point 166. Consequently, envelope intercepts 34 and 38 in FIG. 1A will occur when the head assembly 12 is in the position shown by FIG. 4, while intercept 36 will occur when point 166 passes under the gap 88. If disk 15 rotates counterclockwise, gap 88 will read the largest signal from outer track 162 until reaching point 166 and will thereafter read the largest signal from inner track 160 until the disk 15 rotates back to its original position.

It is clear from FIG. 2 that, if the gap 88 were misaligned outward from the spindle axis 44, then the intersections of the track interface 164 with gap locus 165 would be further apart during initial revolution of disk 15, thereby creating a cateye pattern such as that in FIG. 1B. Inward gap misalignment would have the opposite effect. When both effects are eliminated, the cateye pattern of FIG. 1A results wherein $x_2=0$, thereby indicating that the head is properly aligned.

In FIG. 5, a diagram of the invention, a digital cateye-signal intercept detector, is illustrated and designated by general reference numeral 200. The detector 200 operates upon the principle that the consecutive cateye lobes of the signal 10 alternate in mean carrier frequency. One-half of the difference between the frequencies of tracks 160 and 162 are added to and subtracted from the mean track frequency. Thus the variation of the mean carrier frequency accompanies each intercept 34, 36 and 38. Consequently, the invention detects each change in mean carrier frequency and promptly emits a pulse denoting an intercept.

In general, the detailed circuit design of the invention is not described. Rather, each circuit element will be identified in terms of its function performed as a part of a standard circuit. All flip-flops are presumed responsive to logically true input levels and to trailing-edge triggering on 1-to-0 logical transitions.

The input of the detector 200 is the cateye-signal 10. The output is a pulse train 202 wherein each pulse indicates an immediately preceding intercept of the signal 10. In the case of this and other binary signals shown in this figure, the logical values of 0 and 1 appear as ordinates.

The cateye signal 10 is directed into an input conditioner 204. The function of conditioner 204 is to generate a constant amplitude output 206 having the same time displacement between adjacent zero crossings as the cateye signal 10.

The signal 206 serves as the input to a frequency-modulation detector 208. The detector 208 generates an instantaneous output signal 210 of arbitrary level. The instantaneous value of signal 210 is proportional to the instantaneous carrier frequency deviation of the cateye-signal 10 from its mean, possibly plus a constant.

The signal 210 is the input to a delay equalizer 212 that functions to accurately establish a direct-current reference level midway between the positive and negative peaks of signal 10 to yield an output signal 214. Equalizer 212 thereby increases the accuracy of the invention by providing the output signal 214 whose zero crossings are uniformly delayed, regardless of slope polarity, from the response of frequency-modulation detector 208.

The signal 214 is the input to a polarity detector 216. The detector 216 produces a binary output signal 218 having the logical value 1 when the polarity of signal 214 is positive and a logical value 0 at all other times.

The clocked logic devices of the detector 200 are synchronized by a clock generator 220. An output 222 of generator 220 consists of a periodic pulse train that assumes the logical value 1 for the first part of each cycle and the logical value 0 for the remainder of the cycle. Typically, the duty cycle of clock signal 222 is no greater than 0.5.

Signal 218 is the input to a transition detector 224. Transition detector 224 functions to generate the output signal 202 which is a train of selected clock pulses. Each pulse in the signal 202 is the second clock pulse present after an instant at which signal 218 changes state if a sufficient portion of the first such clock pulse succeeds the transition of the signal 218 to trigger transition detector 224. Otherwise, detector 224 alternatively emits a second complete clock pulse to follow a given transition of the signal 218. In either case one, and only one, pulse appears in output signal 202 in response to each intercept in the cateye-signal 10.

In operation the input conditioner 204 consists of a band-pass amplifier 226, a limiter 228, and an optional band-pass amplifier 230 in cascade. The amplifier 226 raises the amplitude of the cateye-signal 10 to a value sufficient to permit effective limiting. For optimum rejection of extraneous energy, the amplifier 226 is of the band-pass type having a center frequency $$f_{c0} = (f_{ti} + f_{to})/2$$

(typically 1,275,000 hertz) wherein $f_{ti}$ = inner-track frequency (typically 1,280,000 hertz) and $f_{to}$ = outer-track frequency (typically 1,270,000 hertz).

The amplifier 226 can be of a standard design having a pass band transmitting all spectral components of signal 10 with acceptable amplitude and phase characteristics. These spectral components occupy the frequency interval between $$f_1 = f_{c0} - f_m - f_d$$

(typically 1,269,960 hertz) and $$f_2 = f_{c0} + f_m + f_d$$

(typically 1,280,040 hertz) where $f_{c0}$ = center frequency of the cateye carrier, $f_m$ = mean subcarrier modulation frequency (typically 5000 hertz), and $f_d$ = disk rotation frequency (typically 40 hertz).

It can be shown that $$f_m = (f_{ti} - f_{to})/2.$$

It follows that the alternating-current component of an output signal 232 of amplifier 226 is an amplified facsimile of signal 10.

The limiter 228 is of standard design and functions to clip both the positive and negative peaks of the signal 232 at levels equally displaced above and below the rotation-envelope intercepts of the signal 232. A resultant output signal 234 has an alternating-current component of constant amplitude wherein each zero crossing both corresponds to a specific zero crossing of the signal 10 and is identically displaced from the preceding zero crossing.

The band-pass amplifier 230 is similar to amplifier 236. The function of amplifier 230 is to convert the signal 234 to a sinusoidal form if this is required by the particular design of the following frequency-modulation detector 208. If necessary, amplifier 230 can also function to change the level and amplitude of the signal 234 to values optimum at the input of detector 208. In some cases, however, amplifier 230 may not be required.

The output signal 206 of the input conditioner 204 is a frequency-modulated signal whose fundamental frequency alternates between two principal instantaneous values. It can be shown that the instantaneous frequency of signal 206 approximately equals the carrier center frequency $f_{c0}$ when the instantaneous tracking error δ is zero, that it approximately equals the outer-track frequency $f_{to}$ when δ is positive, and that it approximately equals the inner-track frequency $f_{ti}$ when δ is negative. Frequency-modulation detector 208 functions to generate an output signal 210 having an alternating current component whose instantaneous value is proportional to the deviation of the instantaneous frequency of the signal 206 from $f_{c0}$. The detector 208 can utilize any of several standard designs such as a Foster-Seeley discriminator, a combination of a variable-frequency phase-lock oscillator with a balanced analog modulator, or a fully digital detector of integrated-circuit construction. Although the frequency of the signal 206 changes instantaneously, the value of the signal 210 may respond more slowly due to its physical constraints.

The signal 210 generated by detector 208 constitutes the input to the delay equalizer 212. The equalizer 212 consists of a clamp 236 whose output 238 is connected both to the positive input of a differential amplifier 240 and to the input of a peak detector 242. The output signal 244 of the peak detector 242 is processed by a 2:1 attenuator 246, after which a resultant signal 248 is connected to the negative input of the differential amplifier 240. The clamp 236 is of a standard design and functions to generate the signal 238 that is a facsimile of signal 210 but which, in addition, has the direct-current level of its negative peak set equal to 0. Signal 238 is processed by the peak detector 242, also of standard design, to yield the signal 244 essentially equal in value to the positive peak value of the signal 238. The signal 244 can respond to a variation of the peak value of signal 238, but only very slowly, because detector 242 is designed with a time constant equal to several periods of signal 238. The instantaneous value of signal 248, in turn is reduced to one-half the original value by the conventional attenuator 246. The resultant output is the signal 248. Signals 238 and 248, respectively, are the positive and negative inputs to the differential amplifier 240. This amplifier may be of standard monolithic design and is equipped with a potentiometer for adjusting an output offset so that the output 214 will have the value 0 when inputs 238 and 248 simultaneously have that same value.

The polarity detector 216 accepts as its input the signal 214. Detector 216 consists of an amplifier 250 and a Schmitt trigger 252 in cascade. The amplifier 250 is of a conventional low-pass type, such as an integrated-circuit operational amplifier with appropriate feedback, and has a pass band extending from direct current through several times the fundamental frequency of the signal 214 so that both the level and rapid transition of the signal 214 can be accurately preserved. A resultant output signal 254 is a facsimile of the signal 214 amplified sufficiently to assure a slope of high absolute amplitude at each zero crossing in order to optimize the performance of the following trigger 252.

The signal 254 is the input of the Schmitt trigger 252, a standard circuit that may be of the integrated-circuit type. In the idealized form shown, the trigger 252 produces a binary output signal 218 denoted by $E_p$ which is logically true whenever input 254 is positive but is otherwise false. Practical embodiments of the trigger 252, however, are characterized by hysterisis as well as by an input offset and an output inversion. The first two effects cause the positive and negative transitions of the signal 218 to be unequally displaced from the corresponding zero crossing of the signal 214. Both of these two effects can be reduced by appropriate circuit design, while input offset can also be compensated by appropriately adjusting the output offset of the differential amplifier 240. Moreover, the significance of both effects is reduced by the rapid variation of the signal 254 over a wide range. Finally, if logical inversion is necessary in practice to obtain the signal 218 having the characteristics previously described, it can be provided by a conventional logic circuit such as an integrated-circuit type.

All components previously described operate asynchronously in conformity with the nature of the cateye signal 10 being processed. For maximum compatibility with associated equipment that may be connected to the output signal 202, the transition detector 224 is synchronized by a timing signal. That signal is the output signal 222 of the clock generator 220. Signal 222 is a periodic pulse train whose two levels correspond to the logical values 0 and 1 as recognized by the logic circuitry of the detector 224. Although the detector 200 makes no special demands upon the frequency stability of the signal 222, the utility of this signal is increased if its frequency is suitable for synchronizing associated timing equipment external to the detector 200. Therefore, it is appropriate to use a crystal-controlled integrated circuit for the clock generator 220 capable of producing a logic-compatible output of convenient rational frequency (typically 1 megahertz).

As shown in FIG. 5, the binary signal $E_p$ at 218 is the input of the transition detector 224. Transition detector 224 consists of two flip-flops 256 and 258 having normal outputs $Q_1$ and $Q_2$, respectively; of two NAND gates 260 and 262 having outputs $G_1$ and $G_2$, respectively; and of AND gate 264 having output $G_3$. The signal $G_3$ is connected to the output signal 202 denoted by $E_o$. All of the preceding logic elements can be of the integrated-circuit type.

The flip-flops 256 and 258 are both of the D type and are synchronized by the clock signal 222. These flip-flops are connected according to the logical equations $$D_1 = E_p,$$
$$C_1 = C,$$
Flip-flop 256 equations $$D_2 = Q_1,$$
$$C_2 = C.$$
Flip-flop 258 equations Flip-flops 256 and 258 are connected as a shift register so that the outputs $Q_1$ and $Q_2$ are normally false after the input signal $E_p$ at 218 has been false for a sufficient interval. When $E_p$ goes true asynchronously, $Q_1$ will go true in response to the next trailing edge to terminate a clock pulse not excessively truncated by $E_p$. After that, $Q_2$ will go true in response to the trailing edge of the next clock pulse. Both $Q_1$ and $Q_2$ then remain true as long as $E_p$ remains true. When $E_p$ goes false, however, the above sequence is reversed. The signal $Q_1$ then goes false in response to the trailing edge of the first clock pulse not excessively truncated. Signal $Q_2$ then responds to the trailing edge of the next clock pulse by going false.

The NAND gates 260 and 262 are connected according to the equations $$G_1 = \overline{Q_1 Q_2}$$
$$G_2 = \overline{\overline{Q_1}\overline{Q_2}}$$
Input-gate equations Together, the function of these gates is to generate a logically false inhibit signal whenever flip-flop outputs $Q_1$ and $Q_2$ are in the same state. The signal $G_1$ is false whenver both $Q_1$ and $Q_2$ are true, and the signal $G_2$ is false whenever both $Q_1$ and $Q_2$ are false.

The AND gate 254 is connected according to the equation $$G_3 = CG_1 G_2,$$
$$E_o = G_3.$$
Output-gate equation A function of the gate 264 is thus to furnish the output both of the transition detector 224 and of the detector 200. The gate 264 emits every clock pulse in signal 222 not inhibited by either gate 260 or gate 262. Combining the above equations and applying DeMorgan's theorem along with other logical relationships yields the output equation $$E_o = C(Q_1\overline{Q_2} + \overline{Q_1}Q_2).$$

Thus output $E_o$ at signal 202 will contain every clock pulse emitted when $Q_1$ and $Q_2$ are in different states. This condition exists during a single clock pulse following each transition of signal 218, the input to transition detector 224.

Changes may be made in the construction and arrangement of the parts or elements of the embodiments as described herein without departing from the spirit or scope of the invention defined in the following claims.

What is claimed is:

1. A cateye-signal intercept detector for aligning a read-write head above a computer data storage disk, the detector used in conjunction with a standard test disk having two adjacent cateye-type head alignment tracks thereon, the detector comprising:
   a frequency modulation detector connected to the read-write head for receiving the cateye signal and generating an instantaneous output signal proportional to the instantaneous carrier frequency deviation of the cateye signal;

a polarity detector connected to the modulation detector receiving the instantaneous output signal and producing a binary output signal having a logical value 1 when the polarity of the instantaneous output signal is positive and a logical value of zero at all other times; and a transition detector connected to the polarity detector for generating a train of selected clock pulses, the output pulse is the second clock pulse present after an instant in which the binary output signal changes state if a sufficient portion of the first clock pulse succeeds the transition of the binary output signal and triggers the transition detector, if the first clock pulse is not sufficient then the detector alternately emits the second complete clock pulse to follow a given transition of the binary signal.

2. The detector as described in claim 1, further including an input conditioner for generating a constant amplitude output signal having the same time displacement between adjacent zero crossings of the cateye signal, the conditioner connected between the read-write head and the frequency modulator detector.

3. The detector as described in claim 1, further including a delay equalizer connected between the frequency modulator detector and the polarity detector for establishing a direct-current reference level midway between the positive and negative peaks of the instantaneous output signal and providing an output signal to the polarity detector wherein zero crossings are uniformly delayed regardless of slope polarity.

4. A cateye-signal intercept detector for aligning a read-write head above a computer data storage disk, the detector used in conjunction with a standard test disk having two adjacent cateye-type head alignment tracks thereon, the detector comprising:

an input conditioner connected to the read-write head for generating a constant amplitude output signal having the same time displacement between adjacent zero crossings of the cateye-signal;

a frequency modulation detector connected to the input conditioner for receiving the cateye-signal and generating an instantaneous signal proportional to the instantaneous carrier frequency deviation of the cateye-signal;

a polarity detector connected to the modulation detector for receiving the instantaneous output signal and producing a binary output signal having a logical value of 1 when the polarity of the instantaneous output signal is positive and a logical value of zero at all other times; and a transition detector connected to the polarity detector for generating a train of selected clock pulses, the output pulse is the second clock pulse present after an instant in which the binary output signal changes state if a sufficient portion of the first clock pulse succeeds the transition of the binary output signal and triggers the transition detector, if the first clock pulse is not sufficient then the detector alternately emits the second complete clock pulse to follow a given transition of the binary signal.

5. The detector as described in claim 4, further including a delay equalizer connected between the frequency modulation detector and the polarity detector for establishing a direct current reference level midway between the positive and negative peaks of the instantaneous output signal and providing an output signal to the polarity detector wherein zero crossings are uniformly delayed regardless of slope polarity.

6. The detector as described in claim 4, further including a clock generator connected to the transition detector for providing the clock pulses thereto.

7. A cateye signal intercept detector for aligning a read-write head above a computer data storage disk, the detector used in conjunction with a standard test disk having two adjacent cateye-type head alignment tracks thereon, the detector comprising:

an input conditioner connected to the read-write head for generating a constant amplitude output signal having the same time displacement between adjacent zero crossings of the cateye-signal;

a frequency modulation detector connected to the input conditioner for receiving the cateye-signal and generating an instantaneous output signal proportional to the instantaneous carrier frequency deviation of the cateye-signal;

a delay equalizer connected to the frequency modulation detector for establishing a direct current reference level midway between the positive and negative peaks of the instantaneous output signal and providing an output signal to the polarity detector wherein zero crossings are uniformly delayed regardless of slope polarity;

a polarity detector connected to the delay equalizer for receiving the instantaneous output signal and producing a binary output signal having a logical value of 1 when the polarity of the instantaneous output signal is positive and a logical value of zero at all other times;

a transition detector connected to the polarity detector for generating a train of selected clock pulses, the output pulse is the second clock pulse present after an instant in which the binary output signal changes state is a sufficient portion of the first clock pulse succeeds the transition of the binary output signal and triggers the transition detector, if the first clock pulse is not sufficient then the detector alternately emits the second complete clock pulse to follow a given transition of the binary signal; and a clock generator connected to the transition detector for generating a train of selected clock pulses to the detector.

8. A method for aligning a read-write head above a computer data storage disk using a standard test disk having two adjacent cateye-type head alignment tracks thereon, the step comprising:

receiving the cateye-signal from the read-write head and generating an instantaneous output signal proportional to the instantaneous carrier frequency deviation of the cateye-signal;

receiving the instantaneous output signal and producing a binary output signal having a logical value one when the polarity of the instantaneous output signal is positive and a logical value of zero at all other times; and receiving the binary output signal and generating a train of selected clock pulses, the output pulse being the second clock pulse present after an instance which the binary output signal changes state if a sufficient portion of the first clock pulse succeeds the transition of the binary output signal, if the first clock pulse is not sufficient then the second output clock pulse is alternatively emitted following a given transition of the binary signal.

* * * * *